Figure 3:
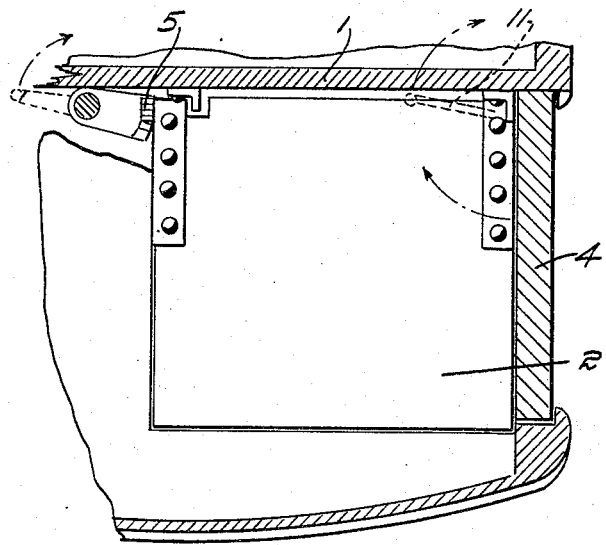

D. POLIQUIN.
TRAP AND DOOR FOR RAILWAY CARS.
APPLICATION FILED OCT. 30, 1915.
1,186,938.
Patented June 13, 1916.
2 SHEETS—SHEET 1.
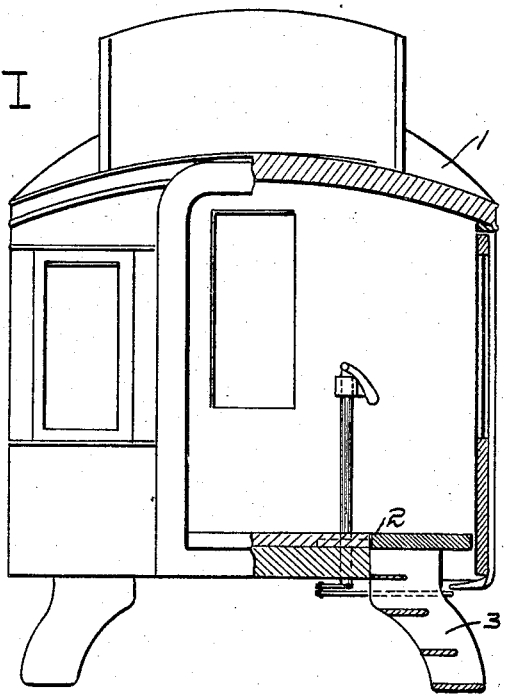
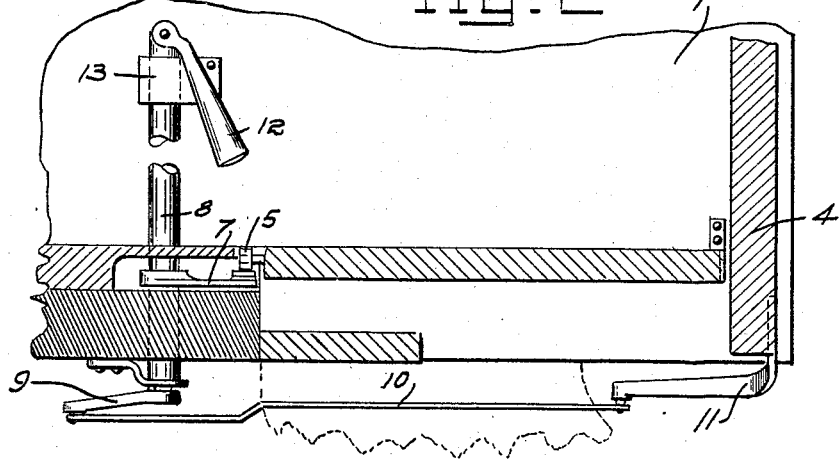
Witness
F. Leemans.
DONA POLIQUIN Inventor
By
Attorneys

D. POLIQUIN.
TRAP AND DOOR FOR RAILWAY CARS.
APPLICATION FILED OCT. 30, 1915.

1,186,938.

Patented June 13, 1916.
2 SHEETS—SHEET 2.

Witness

F. Leemans

Dona Poliquin   Inventor

By Marion & Marion

Attorneys

UNITED STATES PATENT OFFICE.

DONA POLIQUIN, OF MAISONNEUVE, QUEBEC, CANADA.

TRAP AND DOOR FOR RAILWAY-CARS.

1,186,938.  Specification of Letters Patent.  Patented June 13, 1916.

Application filed October 30, 1915. Serial No. 58,755.

*To all whom it may concern:*

Be it known that I, DONA POLIQUIN, a subject of the King of Great Britain, residing at No. 37 Pie IX avenue, Maisonneuve, Province of Quebec, Canada, have invented certain new and useful Improvements in Traps and Doors for Railway-Cars; and I do hereby declare that the following is a full, clear, and exact description of the invention, such as will enable others skilled in the art to which it appertains to make and use the same.

The invention to be hereinafter described relates to traps and door for railway cars.

In order to more clearly disclose the construction, operation, and use of the invention, reference should be had to the accompanying drawings forming part of the present application.

Throughout the several figures of the drawings like reference characters designate the same parts.

Figures 4, 5:
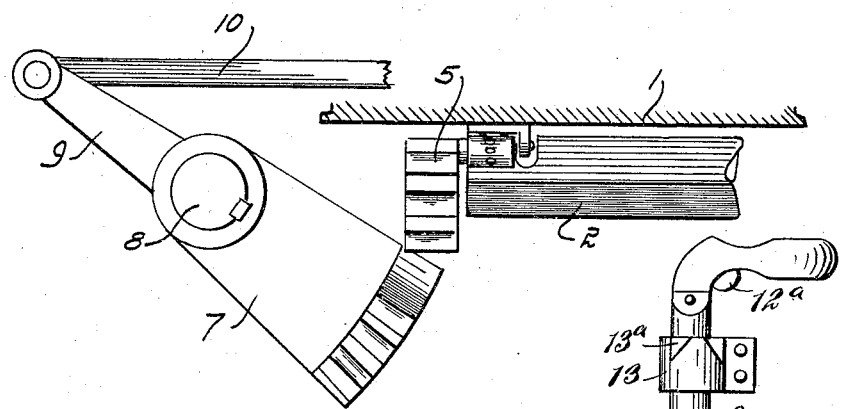

In the drawings: Figure 1 is an end view of a car with the invention applied; partly broken away; Fig. 2 is a fragmentary, detail, sectional view; Fig. 3 is a top plan view of the same; and Fig. 4 is a detail of the trap raising means with the trap partly raised. Fig. 5 is a fragmentary detail in side elevation showing the locking means.

The main objects of the invention are, to provide a neat, durable, and efficient door and trap for railway cars, and means for operating the same, so constructed that the trap, when lowered, will hold the door tightly closed.

Referring to the drawings in detail, 1 designates a railway car or coach of usual construction. A trap 2 is pivotally mounted, at its inner side, on the end of the car, so as to, when lowered, close the well of the steps 3 in the usual manner. The door 4 is pivotally mounted, at its inner edge, on the end of the coach 1, as usual, and extends a slight distance below the trap 2 when lowered, as in Fig. 1.

A segmental pinion 5 is fixedly secured to the inner back corner of trap 2. This pinion is adapted to be engaged by a segmental rack 6 integral with a sector plate 7 keyed on a shaft 8 revolubly mounted through the car platform. As shown in Fig. 2, the plate 7 operates in a suitable recess in the platform, so as to be out of the way. An arm 9 is keyed on the lower end of shaft 8 and is pivotally connected to the inner end of a rod 10 the outer end of which is pivotally connected to the inner end of a crank arm 11, the outer end of which is secured to the door 4. A lever 12 is secured on the upper end of shaft 8, for revolving purposes. This lever is provided with a lug 12$^a$ adapted to engage notches 13$^a$ in a sleeve 13 through which the shaft $a$ is passed, so as to secure the shaft against revolution when the lever is in its lowered position as shown in Fig. 2.

When the door is closed, as in Fig. 1, the trap 2 effectually prevents any opening thereof, and arm 9 is a considerable distance off center with arm 11. To open the door, the lever is swung outwardly so as to revolve shaft 8. When the shaft is revolved, the rack 6 carried by plate 7 engages the pinion 5 secured to the trap 2. This rotates pinion 5 so as to turn the trap upwardly and backwardly, as indicated in Figs. 3 and 4, so as to lift it and open the stair well. The arm 9 is, of course, so arranged relatively to arm 11 as to permit sufficient revolution of shaft 8 to effect the opening of the trap before the door is actuated. When the arms 9 and 11 come on center, the rod 10 forces arm 11 outwardly. This rotates door 2 inwardly against the raised trap so as to leave the steps entirely open. In closing the door the reverse operation will take place, the door being closed first and the trap last. By means of the lug 12$^a$ of lever 12 and the coöperating notches 13$^a$ of sleeve 13, the shaft 8 may be secured against revolution so as to effectually lock the door and trap in closed or open position, as desired.

It is thought that the construction, operation, and use of the invention will be clear from the preceding detailed description.

Changes may be made in the construction, arrangement, and disposition of the several parts of the invention without in any way departing from the field and scope of the same, and it is meant to include all such within this application wherein only a preferred form has been disclosed.

Having thus fully described my invention, what I claim as new and desire to secure by Letters Patent is:

1. In combination, a car, a platform provided with a stair well and steps contained thereby, a trap pivotally connected at its inner edge to the car and adapted to close the stair well when lowered, a door pivotally connected to the end of the car and adapted to be maintained in closed position by the said trap when it is lowered, a pinion secured to the inner back corner of the trap, a revoluble shaft, a rack secured thereto and adapted to mesh with the pinion rack, an arm keyed on the lower end of the said shaft, a crank arm secured to the said door, a rod pivotally connecting the said arms, means for revolving the said shaft, and means for locking the said shaft against revolution.

2. In combination with a car platform having a stair well, a hinged door and a hinged trap to close the stair well, a pinion on the trap, a segmental rack disposed in mesh with the pinion, a shaft secured to the rack, a sleeve disposed on the shaft and fixed against movement and provided with notches, a lever pivoted on the shaft and provided with a lug arranged to enter either of the notches to lock the shaft against movement, and actuating means from the shaft to the door to open and close the same.

In witness whereof I have hereunto set my hand in the presence of two witnesses.

DONA POLIQUIN.

Witnesses:
A. BASTIERO,
F. LEEMANS.